US006607848B1

(12) United States Patent
Oka et al.

(10) Patent No.: US 6,607,848 B1
(45) Date of Patent: Aug. 19, 2003

(54) MAGNETIC RECORDING MEDIUM AND MAGNETIC RECORDING DEVICE

(75) Inventors: Masahiro Oka, Yokohama (JP); Shinya Katayama, Yokohama (JP)

(73) Assignee: Showa Denko K.K., Tokyo (JP)

( * ) Notice: Subject to any disclaimer, the term of this patent is extended or adjusted under 35 U.S.C. 154(b) by 2 days.

(21) Appl. No.: 09/807,983

(22) PCT Filed: Aug. 29, 2000

(86) PCT No.: PCT/JP00/05827

§ 371 (c)(1),
(2), (4) Date: May 1, 2001

(87) PCT Pub. No.: WO01/16945

PCT Pub. Date: Mar. 8, 2001

(30) Foreign Application Priority Data

Sep. 1, 1999 (JP) .......................................... 11-246968

(51) Int. Cl.$^7$ ............................. G11B 5/66; G11B 5/70; H01F 1/00; B32B 15/00
(52) U.S. Cl. ............................... 428/694 TS; 428/900; 428/216; 428/336; 428/611; 428/667
(58) Field of Search .......................... 428/694 TS, 900, 428/336, 216, 667, 611

(56) References Cited

U.S. PATENT DOCUMENTS

| 5,352,501 A | 10/1994 | Miyamoto et al. | 428/64 |
| 5,492,745 A | 2/1996 | Yokoyama | 428/65.3 |
| 5,494,722 A | 2/1996 | Oka et al. | 428/65.3 |
| 5,736,262 A | 4/1998 | Ohkijima et al. | 428/611 |
| 6,143,388 A | * 11/2000 | Bian et al. | 428/65.3 |
| 6,150,015 A | * 11/2000 | Bertero et al. | 428/332 |
| 6,221,481 B1 | * 4/2001 | Wu et al. | 428/332 |

FOREIGN PATENT DOCUMENTS

| JP | 4-321919 | 11/1992 |
| JP | 8-329444 | 12/1996 |
| JP | 9-16937 | 1/1997 |
| JP | 10-334444 | * 12/1998 |
| JP | 11-219511 | 8/1999 |
| JP | 11-250435 | 9/1999 |
| JP | 11-283233 | 10/1999 |
| JP | 2000-67423 | 3/2000 |
| JP | 2000-99935 | 4/2000 |

* cited by examiner

Primary Examiner—Holly Rickman
(74) Attorney, Agent, or Firm—Oblon, Spivak, McClelland, Maier & Neustadt, P.C.

(57) ABSTRACT

A high density recording medium excellent in a coercive force and excellent also in read write characteristics such as N/S ratio and thermal stability of the magnetic recording layer, and a magnetic recording apparatus employing it, are presented. A magnetic recording medium comprising a substrate and, formed sequentially thereon, at least a non-magnetic interlayer made of a Co alloy and a Co alloy magnetic recording layer, wherein the crystal structures of the interlayer and the magnetic recording layer are both hcp structures, and the relation between the crystal lattice constant (Li) of the interlayer and the crystal lattice constant (Lm) of the magnetic recording layer, satisfies the following formula:

$$|Lm-Li|/Lm<0.019$$

and a magnetic recording apparatus employing it.

18 Claims, No Drawings

MAGNETIC RECORDING MEDIUM AND MAGNETIC RECORDING DEVICE

TECHNICAL FIELD

The present invention relates to a magnetic recording medium and a magnetic recording apparatus employing it. Particularly, it resides in a high density recording medium excellent in a coercive force and excellent also in read write characteristics such as S/N ratio and thermal stability of the magnetic recording layer.

BACKGROUND ART

In recent years, the range of application of magnetic recording apparatus such as magnetic disk apparatus, flexible disk apparatus and magnetic tape apparatus, was remarkably expanded. As their importance increased, with respect to such apparatus and magnetic recording media employed therein, measures were taken to meet the demand for high recording density. For example, along with high densification of the recording density of magnetic recording media, use of a MR head or a GMR head as a recording/reproducing head was started and the PRML (Partial Response Maximum Likelihood) technique was introduced as a technique to correct errors of digital signals, and since then, the increase of the recording density has been more remarkable, and recently, the increase has been continuing at a pace of 60% per year.

Thus, with respect to magnetic recording media, it is required to achieve further higher densification of the recording density in future. Accordingly, it is required to achieve a higher coercive force, a higher signal to noise ratio (S/N ratio) and a higher resolution. Further, in recent years, the thickness of a magnetic recording layer tends to be thin to achieve a high recording density. As a result, a phenomenon has been distinct such that the magnetically recorded magnetization is weakened by thermal disturbance by fine magnetic grains, and thermal stability of a magnetic recording medium has become a serious technical problem. Especially when it is attempted to improve the S/N ratio, the thermal stability tends to decrease in many cases, and it is a target of research to satisfy both of the two properties. This is attributable to the fact that usually in a magnetic recording medium excellent in the S/N ratio, the crystal grain sizes of magnetic grains constituting the magnetic recording layer are fine, which is effective to reduce the noise of the magnetic recording medium, but, on the other hand, is likely to bring about an unstable state from the view point of the thermal stability of the magnetic recording.

Further, with magnetic recording media of recent years, factors of read write characteristics such as S/N ratio and PW50, have become more important to comply with a sharp increase of the recording density. Here, PW50 means a half value width of an isolate pulse observed when a solitary wave of a recording signal is subjected to recording/reproducing in magnetic recording, and is an amount directly relating to the resolution of the signal. The smaller the amount, the better the magnetic recording medium.

Heretofore, as a technique to realize a high coercive force and a high S/N ratio, a method is known in which a Co alloy interlayer having a hcp structure is formed between a Cr or Cr alloy undercoat layer and a Co alloy magnetic recording layer (JP-A-8-329444 etc.). This method is reported to have an effect to increase the coercive force of the magnetic recording medium to a large extent and to improve the read write characteristics. However, even if this technique was applied as it was, the above-mentioned effect for the thermal stability of the medium was not adequate, because, as mentioned above, if it was attempted to improve the S/N ratio, the thermal stability of magnetic recording was led to decrease. In the conventional technique to secure a high coercive force and a high S/N ratio employing a Co alloy interlayer, if the thickness of the Co alloy interlayer is too thick, the read write characteristics deteriorate remarkably, and in order to improve the read write characteristics such as the S/N ratio and PW50, it was necessary to set the thickness of the Co alloy interlayer to be as thin as possible. On the other hand, from the viewpoint of securing the thermal stability, it was necessary to set the thickness of the Co alloy interlayer to be at least a certain level.

Nowadays when the read write characteristics such as PW50 and S/N ratio are regarded as extremely important, it is extremely difficult to satisfy both excellent thermal stability and read write characteristics by the conventional technique employing a Co alloy interlayer.

DISCLOSURE OF THE INVENTION

The present invention has been accomplished on the basis of a discovery that by controlling the relation of crystal structures of a Co alloy interlayer and a Co alloy magnetic recording layer formed thereon, it is possible to improve the thermal stability of magnetic recording without impairing the read write characteristics such as PW50 and S/N ratio of a magnetic recording medium, even if the Co alloy magnetic recording layer contains fine magnetic grains. Namely, the gist of the present invention resides in a magnetic recording medium comprising a substrate and, formed sequentially thereon, at least a non-magnetic interlayer made of a Co alloy and a Co alloy magnetic recording layer, wherein the crystal structures of the interlayer and the magnetic recording layer are both hcp structures, and the relation between the crystal lattice constant ($L_i$) of the interlayer and the crystal lattice constant ($L_m$) of the magnetic recording layer, satisfies the following formula:

$$|L_m - L_i|/L_m < 0.019$$

and a magnetic recording apparatus employing it.

According to the present invention, it becomes possible to provide an excellent high recording density magnetic recording medium, whereby the drawbacks of the conventional Co alloy interlayer are overcome.

BEST MODE FOR CARRYING OUT THE INVENTION

Now, the present invention will be described in detail.

The magnetic recording medium of the present invention is one having a non-magnetic Co alloy interlayer and a Co alloy magnetic recording layer sequentially formed on a substrate.

As the substrate in the magnetic recording medium of the present invention, an optional one may be employed, such as, an Al alloy substrate containing Al as the main component, such as an Al—Mg alloy, or a substrate made of ordinary soda glass, aluminosilicate glass, crystallized glasses, silicon, titanium, ceramics or various resins. Among them, it is preferred to employ an Al alloy substrate or a glass substrate of e.g. crystallized glass.

In the present invention, an optional Co alloy magnetic material may be employed for the Co alloy magnetic recording layer. For example, Co or an alloy magnetic material such as CoNi, CoSm, CoCrTa, CoNiCr or CoCrPt, or one having an element such as Ni, Cr, Pt, Ta, W or B, or a compound such as $SiO_2$, further added to such a Co alloy, such as CoCrPtTa, CoCrPtB, CoNiPt or CoNiCrPtB, may be employed. In the present invention, a Co alloy containing at least 1 atomic % and less than 30 atomic % of Cr, is particularly preferred. Further, it is preferred to incorporate boron (B), whereby crystal grains in the Co alloy magnetic recording layer will be fine, the S/N ratio will be good, and deterioration in the thermal stability can be suppressed, and the effects of the present invention will remarkably be shown. The content of B is preferably from 1 to 10 atomic %. The thickness of the Co alloy magnetic recording layer may suitably be selected depending upon the magnetic recording medium to be produced. However, in general, if it is too thick, the read write characteristics tend to deteriorate. Accordingly, the thickness is from 50 to 400 Å, preferably from 100 to 300 Å, more preferably from 100 to 250 Å.

The Co alloy interlayer is usually a non-magnetic layer made of a Co alloy containing Cr. Here, the content of Cr is preferably, for example, from 30 to 60 atomic %, particularly from 35 to 50 atomic %. If it is less than 30 atomic %, the interlayer itself may have a magnetic nature, such being undesirable since it adversely affects the recording magnetization of the Co alloy magnetic recording layer. On the other hand, if the content of Cr is too much beyond 60 atomic %, such is again likely to impair the crystal structure of the Co alloy interlayer.

The thickness of the Co alloy interlayer may suitably be selected depending upon the magnetic recording medium to be produced, but it is usually preferably be from 1 to 300 Å, particularly from 5 to 100 Å, especially from 10 to 50 Å.

Both the Co alloy interlayer and the Co alloy magnetic recording layer are alloy layers containing Co as the base material. However, because of the different roles of the respective layers, the types and amounts of elements to be incorporated other than Co are substantially different between the respective layers in many cases. The Co alloy magnetic recording layer is required to be made to have a high coercive force and to have crystal grains in the layer as small as possible, in order to accomplish high density recording, and for this purpose, the types and amounts of elements to be incorporated are optimized. On the other hand, the Co alloy interlayer is preferably made to be non-magnetic in order to minimize an adverse effect to magnetization for recording on the Co alloy magnetic recording layer. In this respect, the Co alloy magnetic recording layer and the Co alloy interlayer necessarily have different compositions. However, on the other hand, when it is taken into consideration that in the preparation of these layers, the Co alloy interlayer is formed first and then, the Co alloy magnetic recording layer is formed on this Co alloy interlayer, it becomes necessary, in order to obtain a good Co alloy magnetic recording layer, to adjust the crystal structure of the Co alloy interlayer so that the crystal structure of the Co alloy interlayer becomes as close as possible to the crystal structure of the Co alloy magnetic recording layer.

Therefore, in the present invention, it is necessary to control the mutual crystal states of the Co alloy interlayer and the Co alloy magnetic recording layer to be in a specified range. Namely, in the present invention, crystals of the interlayer and the magnetic recording layer are of hcp structures, and the relation between the crystal lattice constant (Li) of the interlayer and the crystal lattice constant (Lm) of the magnetic recording layer, satisfies the following formula, to obtain a Co alloy magnetic recording medium having a good layer structure:

$$|Lm-Li|/Lm<0.019$$

Namely, the crystal lattice constant of the Co alloy interlayer is adjusted so that the difference from the crystal lattice constant of the Co alloy magnetic recording layer is smaller than a specific value satisfying the above formula, i.e. the difference $|Lm-Li|$ between the crystal lattice constant (Lm) of the magnetic recording layer and the crystal lattice constant (Li) of the interlayer, is made to be smaller than 1.9% of the crystal lattice constant Lm of the Co alloy magnetic recording layer, to accomplish the present invention. The smaller this $|Lm-Li|/Lm$, i.e. the closer the crystal lattice constant of the magnetic recording layer and the crystal lattice constant of the interlayer, the better. More preferably, $|Lm-Li|/Lm$ is not more than 0.017, further preferably not more than 0.015, most preferably not more than 0.005. As one of methods for obtaining this $|Lm-Li|/Lm$, a method may be employed wherein the spacing d of crystal faces of Co is obtained by a usual θ–2θ measurement by an X-ray diffraction apparatus, and the difference in the d value between the Co alloy interlayer and the Co alloy magnetic recording layer, is divided by the d value of the Co alloy magnetic recording layer.

$$|Lm-Li|/Lm=|dm-di|/dm$$

dm: the d value of the Co alloy magnetic recording layer
di: the d value of the Co alloy interlayer As a method for adjusting the crystal lattice constant of the Co alloy interlayer, such can be accomplished usually by incorporating a suitable element to the Co alloy interlayer. Here, as the element to be incorporated, a noble metal element is typically employed. The noble metal element is usually one commonly known, and specifically, it may be Pt, Ir, Os, Pd, Rh, Ru, Ag or Au, preferably Pt, Os, Pd, Rh or Ru, particularly Pt.

The noble metal element to be incorporated to the Co alloy interlayer, is preferably one having a metal bond radius of not more than 1.4 Å. The metal bond radii of typical noble metal elements are Pt=1.385 Å, Ir=1.335 Å, Os=1.35 Å, Pd=1.37 Å, Rh=1.34 Å and Ru=1.34 Å.

The amount of the noble metal element to be incorporated to the Co alloy interlayer is usually at least 1 atomic % so that a significant effect can be expected. However, if the content is too much, the crystal structure of the Co alloy interlayer is impaired, whereby the fine structure of crystal grains of the Co alloy magnetic recording layer formed thereon is likely to be adversely affected. Accordingly, it is preferably at most 20 atomic %, more preferably at most 15 atomic % and further preferably at most 10 atomic %.

Further, in the present invention, it is preferred to provide an undercoat layer made of pure Cr or a Cr alloy layer containing Cr as the main component, between the substrate and the Co alloy interlayer. Because the crystal structure of Cr in the undercoat layer facilitates the epitaxial crystal growth in the Co alloy interlayer, and refines the crystal grains and controls the alignment of the crystal faces. The thickness of the undercoat layer may suitably selected depending upon the magnetic recording medium to be produced, but it is usually preferably from 10 to 300 Å, particularly from 50 to 200 Å. Further, the alloy composition includes, in addition to pure Cr, e.g. one having a second or third element, such as V, Ti, Mo, Zr, Hf, Ta, W, Ge, Nb, Si, Cu or B, added to Cr for the purpose of crystal matching with the Co layer, or Cr oxide. Among them, pure Cr or one having Ti, Mo, W, V, Ta, Si, Nb, Zr or Hf, is preferred. With respect to the content of such a second or third element, the optimum amount varies depending upon each element, but it is usually within a range of from 1 to 60 atomic %, preferably from 5 to 50 atomic %, more preferably from 5 to 30 atomic %. The thickness may sufficiently be one adequate to obtain alignment of the Co alloy interlayer and is preferably from 1 to 500 Å, more preferably from 3 to 300 Å, particularly from 5 to 100 Å.

Further, it is preferred to provide a seed layer having a B2 crystal structure such as NiAl, between this undercoat layer and the substrate. This is intended to refine crystal grains in each layer, and the layer thickness is preferably from 50 to 5,000 Å, more preferably from 100 to 2,000 Å, particularly from 300 to 800 Å.

In recent years, it is common to use glass as a substrate for a magnetic recording medium from the viewpoint of securing impact resistance. In the case of using a glass substrate, it is particularly preferred to provide a seed layer such as NiAl.

As a process for producing the magnetic disk of the present invention, a conventional process may suitably be employed. Usually, it is common to firstly carry out washing and drying of a substrate. Also in the present invention, it is preferred to carry out washing and drying prior to forming each layer, with a view to securing the adhesion of each layer.

In the production of the magnetic recording medium of the present invention, it may sometimes be preferred to form a non-magnetic metal coating layer of e.g. NiP on the substrate surface. As a method for forming the non-magnetic metal coating layer, a method which is used for forming a thin film, such as a sputtering method, a vacuum deposition method or a CVD method, may be employed. In the case of a substrate made of a conductive material, it is possible to employ electroplating. The thickness of the non-magnetic metal coating layer may be at least 500 Å. However, taking into consideration the productivity of the magnetic recording medium, it is preferably from 500 to 5,000 Å, more preferably from 500 to 3,000 Å.

Further, in the case of using a glass substrate of e.g. aluminosilicate glass or crystallized glass, it is preferred to form the above-mentioned NiAl alloy layer as the coating layer. In this case, the thickness of the coating layer is the same as of the above-mentioned NiAl seed layer. The region in which the non-magnetic metal coating layer is to be formed, is preferably over the entire region of the substrate surface, but it may be formed only on a part thereof, for example, only on a region at which texturing is to be applied.

Further, it is preferred to apply texturing in the recording direction, e.g. concentrically in the case of a disk, on the substrate surface or on the substrate surface having the non-magnetic metal coating layer formed. In the present invention, concentric texturing refers to a state where fine grooves are numerously formed in the circumferential direction of the substrate by polishing in a circumferential direction, by means of a mechanical texturing method using free abrasive grains and a texturing tape or a texturing processing using a laser beam or the like, or by means of a combination thereof.

The type of free abrasive grains to apply the mechanical texturing is most preferably diamond abrasive grains, particularly ones having the surface processed by graphitization treatment. As another abrasive grains to be used for the mechanical texturing, alumina abrasive grains are widely used. However, diamond abrasive grains exhibit an extremely good performance, from the viewpoint that the easy magnetization axis is aligned along the texturing grooves. The mechanism for this is not yet clearly understood, but a very good reproducible result has been obtained. The effects of the present invention are not fundamentally affected by the surface of the substrate irrespective of what value the surface roughness (Ra) takes. However, to realize high density recording, it is effective that the head flying height is as low as possible, and one of the features of such a substrate is excellent surface smoothness. Accordingly, Ra of the substrate surface is preferably at most 10 Å, more preferably at most 5 Å, particularly at most 3 Å. Here, the determination of Ra is supposed to be done by means of a feeler type surface roughness meter. Here, a feeler is used of a size that the forward end of the feeler for the measurement has a radius of about 0.2 $\mu$m.

Usually, an optional protective layer is formed on the Co alloy magnetic recording layer, and then a lubricant layer is formed. For the protective layer, a carbonatious layer of e.g. carbon (C), carbon hydride, carbon nitride, amorphous carbon or SiC, or a protective layer material commonly employed, such as $SiO_2$, $Zr_2O_3$ or TiN, may be employed. Further, the protective layer may be constituted by two or more layers. The thickness of the protective layer is from 10 to 50 Å, particularly from 10 to 100 Å, and is preferably set to be as thin as possible within a range where the durability can be secured. The lubricant to be used for the lubricant layer may, for example, be a fluorine type lubricant, a hydrocarbon type lubricant or a mixture thereof, and the lubricant layer is formed usually in a thickness of from 1 to 50 Å, preferably from 10 to 30 Å. Further, in the magnetic recording medium of the present invention, the Co alloy magnetic recording layer may be one having a laminated structure of two or more layers.

The film-forming method to form each layer of the magnetic recording medium, is optional, and for example, a DC (magnetron) sputtering method, a high frequency (magnetron) sputtering method, an ECR sputtering method or a physical vapor deposition method such as a vacuum vapor deposition method, may be mentioned.

Further, the conditions for the film forming are not particularly limited, and the ultimate vacuum, the system and the substrate temperature for heating the substrate, the sputtering gas pressure, the bias voltage, etc., may be suitably determined depending upon the film-forming apparatus. For example, in the sputtering film forming, in a usual case, the ultimate vacuum is at most $1 \times 10^{-6}$ Torr, the substrate temperature is from room temperature to 400° C., the sputtering gas pressure is from $1 \times 10^{-3}$ to $20 \times 10^{-3}$ Torr, and the bias voltage is usually from 0 to -500V. At the time of film forming, it is usually preferred to heat the substrate to a temperature of from 10 to 350° C. to facilitate segregation of Cr in the Co alloy magnetic recording layer. The heating of the substrate may be carried out prior to the formation of the undercoat layer, and when a transparent substrate having a low thermal absorptivity is used, a metal coating film of NiP may preliminarily be formed in order to increase the thermal absorptivity, or a seed layer or the like is formed, before heating the substrate, and then an undercoat layer, a Co alloy interlayer and the Co alloy magnetic recording layer, may be formed.

The magnetic recording apparatus of the present invention is a magnetic recording apparatus comprising at least the above described magnetic recording medium, a driving section to drive the medium in a recording direction, a magnetic head comprising a recording section and a reproducing section, a means to relatively move the magnetic head against the magnetic recording medium, and a recording/reproducing signal treating means to carry out input of signals to the magnetic head and reproduction of output signals from the magnetic head. By constituting the reproducing section of the above magnetic head by a MR head, an adequate signal intensity can be obtained even at a high recording density, and it is possible to realize a magnetic recording apparatus having a high recording density. Further, this magnetic head is permitted to fly at a height lower than before at a flying height of at least 0.01 μm and less than 0.05 μm, whereby the output can be improved to obtain a high apparatus S/N, and it is possible to present a magnetic recording apparatus having a large capacity and high reliability. Further, by combining a signal treating circuit by a maximum likelihood method, the recording density can further be improved. For example, sufficient S/N can be obtained even when recording/reproducing is carried out at a recording density of 2 G bits per square inch at a track density of at least 10 kTPI and at a linear recording density of at least 200 kFCI.

Further, by constituting the reproducing section of the magnetic head by a GMR head comprising a plurality of conductive magnetic layers whereby mutual magnetization directions are relatively changed by an external magnetic field to create a substantial change in resistance, and conductive non-magnetic layers disposed between such conductive magnetic layers, or by a GMR head utilizing a spin valve effect, it is possible to further increase the signal intensity, and it is possible to realize a magnetic recording apparatus having a high reliability with a linear recording density of at least 240 kFCI and with 3 gigabits per square inch.

The magnetic recording medium of the present invention is effective particularly when recording is carried out at a track density of at least 34 kTPI, a linear recording density of at least 415 kFCI and at a recording density of at least 15 gigabits per square inch. As the recording density increases, the magnetization region corresponding to 1 bit becomes small, and the thermal stability of such magnetization tends to be poor. Accordingly, as the recording density increases, the thermal stability of the recording magnetization tends to be poor, and attenuation of the recording signals is likely to occur. The present invention is effective to improve the thermal stability of such recording magnetization, and this effect becomes particularly distinct at the time of a higher recording density, for example, at least 15 gigabits per square inch as mentioned above, as compared with one wherein the present invention is not used.

Now, the present invention will be described in further detail with reference to the following Examples. However, the present invention is by no means restricted to the following Examples unless they exceed the gist of the invention.

EXAMPLES 1 TO 4, COMPARATIVE EXAMPLE 1, REFERENCE EXAMPLES 1 AND 2

A vacuum chamber in which a glass substrate for a hard disk was set, was evacuated to a level of not higher than $1.0 \times 10^{-5}$ Pa beforehand. The glass substrate used here was made of a lithium-reinforced crystallized glass and had Ra of about 5 Å, an outer diameter of 65 mm and an inner diameter of 20 mm. Further, the substrate was heated to about 250° C., and thin films were laminated in the order of a $Ni_{50}Al_{50}$ layer, a $Cr_{94}Mo_6$ layer, a CoCrPt layer, a $Co_{66}Cr_{20}B_6Pt_8$ layer, a carbon protective layer and a fluorine type lubricant (Fonblin Z-Dol 2000, manufactured by Ausimont K.K.). Film forming of layers other than the fluorine type lubricant layer was all conducted by means of a DC sputtering method, and no application of a bias voltage to the substrate was carried out. Further, the argon gas partial pressure during the film forming was set to be about $7.0 \times 10^{-1}$ Pa.

The layered structure was set to be, from the top, C/CoCrBPt/CoCrPt/CrMo/NiAl/substrate. Among them, the composition of the CoCrPt layer was set to be $CO_{56}Cr_{42}Pt_2$ atomic %. The thicknesses of the respective layers were 600 Å of the NiAl layer, 100 Å of the $Cr_{94}Mo_6$ layer, 250 Å of the $CO_{66}Cr_{20}B_6Pt_8$ layer, and 50 Å of the carbon protective layer, and the thickness of the CoCrPt layer was changed to 0, 3, 5, 10 and 20 Å. Among them, one wherein the thickness of the CoCrPt interlayer was 0Å, was taken as Comparative Example 1, and likewise, those wherein the thicknesses of the CoCrPt interlayers were 3, 5, 10 and 20 Å, were taken as Examples 1, 2, 3 and 4, respectively. With respect to the magnetic recording media thus prepared, the output attenuation was investigated. Usually, a medium having a higher S/N ratio (SNR) tends to be thermally more unstable, and it is a feature of the present invention to satisfy both a high S/N ratio and suppression of the output attenuation.

As a reference example, Reference Example 1 shows the S/N ratio and the output attenuation of a magnetic disk wherein on the above-mentioned crystallized glass substrate, similar NiAl, CrMo, CoCrTaPt type magnetic film material and a carbon protective layer were laminated in this order. Likewise, Reference Example 2 shows the S/N ratio and the output attenuation of a magnetic disk medium in which on the crystallized glass substrate, NiAl, CrMo, a CoCrBPt type magnetic material and a carbon protective layer were laminated in this order. It is evident that as the S/N ratio improves, the output attenuation increases. The results of these measurements are shown in Table 1.

|  | CoCrPt film thickness (Å) | SNR (dB) | Output attenuation (dB/decade) |
| --- | --- | --- | --- |
| Reference Example 1 | 0 | 28.51 | −0.03491 |
| Reference Example 2 | 0 | 28.20 | −0.03090 |
| Comparative Example 1 | 0 | 27.41 | −0.02620 |
| Example 1 | 3 | 27.32 | −0.01770 |
| Example 2 | 5 | 27.49 | −0.01950 |
| Example 3 | 10 | 27.42 | −0.01400 |
| Example 4 | 20 | 27.29 | −0.00970 |

It is clearly observed that by the insertion of the Pt-containing Co alloy interlayer, the output attenuation can be reduced without an substantial deterioration of the S/N ratio. It is clearly observed that departing from the relation between SNR and output attenuation, on a linear line, as observed between the Reference Examples and the Comparative Example, only the output attenuation decreases with an increase of the thickness of the CoCrPt interlayer, while SNR is substantially constant.

EXAMPLES 5 TO 8 AND COMPARATIVE EXAMPLES 2 TO 5

Further, in the same manner, one wherein $Co_{63}Cr_{37}$ was employed as the Co alloy interlayer, and one wherein the Pt-containing Co alloy interlayer of the present invention was employed, were prepared. The thicknesses of the respective interlayers were changed to 20, 50, 100 and 200 Å. Samples wherein the $Co_{63}Cr_{37}$ interlayer containing no Pt was employed, were taken as Comparative Examples 2 to 5, and samples wherein Pt-containing $Co_{56}Cr_{42}Pt_2$ was employed as the interlayer, were taken as Examples 5 to 8. Measurements were made to examine how the PW50 value of each magnetic disk changed, and the results are shown in Table 2. As mentioned above, the PW50 value is an extremely important parameter to increase the linear recording density of a magnetic disk, and the smaller the value, the better the characteristic.

In Comparative Example 4 (where the thickness of the interlayer was 100 Å), after forming the Co alloy interlayer, the Co (100) face spacing d value of the Co alloy interlayer was obtained by a usual θ-2θ measurement by means of an X-ray diffraction apparatus, manufactured by Philips. Further, after forming the Co alloy magnetic layer, the Co (100) face spacing d value of the Co alloy magnetic layer, was obtained in the same manner. The Co (100) face spacing d value and the value of |Lm−Li|/Lm obtained based thereon, are shown in Table 3.

TABLE 2

|  | Film thickness of interlayer [Å] | PW50 [nsec] |
| --- | --- | --- |
| Comparative Example 2 | 20 | 19.57 |
| Comparative Example 3 | 50 | 19.82 |
| Comparative Example 4 | 100 | 20.96 |
| Comparative Example 5 | 200 | 23.99 |
| Example 5 | 20 | 19.41 |
| Example 6 | 50 | 19.27 |
| Example 7 | 100 | 19.39 |
| Example 8 | 200 | 19.54 |

These results may be represented by a graph as shown in FIG. 2.

With the conventional Co alloy interlayer containing no Pt, PW50 sharply deteriorates as the thickness increases. Whereas, in the case of the Pt-containing Co alloy interlayer, no substantial deterioration is observed. This is an extremely advantageous feature in order to obtain high recording/reproducing characteristics while securing the above-mentioned thermal stability.

EXAMPLE 9

A magnetic disk was prepared under the same conditions as in Comparative Example 4 except that the composition of the Co alloy interlayer was changed to $Co_{54}Cr_{37}Pt_9$. The Co (100) face spacing d values of the Co alloy interlayer and the Co alloy magnetic layer were obtained by using the same method as in Comparative Example 4. The Co (100) face spacing d values and the values of |Lm−Li|/Lm obtained based thereon, are shown in Table 3.

TABLE 3

|  | Comparative Example 4 | Example 9 |
| --- | --- | --- |
| Co (100) face spacing d value of the Co alloy interlayer | 1.2701 Å | 1.2940 Å |
| Co (100) face spacing d value of the Co alloy magnetic recording layer | 1.2965 Å | 1.2964 Å |
| \|Lm-Li\|/Lm | 0.020 | 0.002 |

Example 7 (containing 2 atomic % of Pt in the Co alloy interlayer) shows good PW50, and its |Lm−Li|/Lm is assumed to be about 0.016.

The |Lm−Li|/Lm of Comparative Example 4 (containing no Pt in the Co alloy interlayer) was 0.020 as a result of the measurement, and the recording characteristic PW50 was poor.

In the case of Example 9 containing 9% of Pt in the Co alloy interlayer, the |Lm−Li|/Lm was 0.002 as a result of the measurement, and it is evident that the crystal lattice constant of the Co alloy interlayer is very close to the crystal lattice constant of the Co alloy magnetic recording layer, whereby it is expected to show good recording characteristic PW50.

INDUSTRIAL APPLICABILITY

According to the present invention, it is possible to provide a magnetic recording medium excellent in the thermal stability without impairing the read write characteristics.

What is claimed is:

1. A magnetic recording medium comprising a substrate and, formed sequentially thereon, at least a non-magnetic interlayer made of a Co alloy and a Co alloy magnetic recording layer, wherein the crystal structures of the interlayer and the magnetic recording layer are both hcp structures;

the relation between the crystal lattice constant (Li) of the interlayer and the crystal lattice constant (Lm) of the magnetic recording layer satisfies the following formula:

$|Lm-Li|/Lm<0.017$; and the Co alloy interlayer contains from 1 to 20 atomic % of a noble metal element.

2. The magnetic recording medium according to claim 1, wherein the atomic radius of the noble metal element is at most 1.4 Å.

3. The magnetic recording medium according to claim 1, wherein the noble metal element is at least one element selected from Pt, Os, Pd, Rh and Ru.

4. A magnetic recording medium comprising a substrate and, formed sequentially thereon, at least a non-magnetic interlayer made of a Co alloy and a Co alloy magnetic recording layer, wherein the crystal structures of the interlayer and the magnetic recording layer are both hcp structures;

the relation between the crystal lattice constant (Li) of the interlayer and the crystal lattice constant (Lm) of the magnetic recording layer satisfies the following formula:

$|Lm-Li|/Lm<0.017$; and the Co alloy interlayer contains Pt.

5. The magnetic recording medium according to claim 1, wherein the Co alloy interlayer is a non-magnetic layer made of a Co alloy containing Cr.

6. The magnetic recording medium according to claim 1, wherein the Co alloy interlayer is a non-magnetic layer made of a CoCrPt alloy.

7. The magnetic recording medium according to claim 5, wherein the Cr content in the Co alloy interlayer is from 30 to 60 atomic %.

8. The magnetic recording medium according to claim 1, wherein the thickness of the interlayer is from 1 to 300 Å.

9. The magnetic recording medium according to claim 1, wherein the Co alloy magnetic recording layer is a Co alloy containing at least 1 atomic % and less than 30 atomic % of Cr.

10. The magnetic recording medium according to claim 1, wherein the Co alloy magnetic recording layer contains boron.

11. The magnetic recording medium according to claim 1, wherein the thickness of the Co alloy magnetic recording layer is at most 400 Å.

12. The magnetic recording medium according to claim 1, which has an undercoat layer made of Cr or a Cr alloy between the substrate and the Co alloy interlayer.

13. The magnetic recording medium according to claim 12, which has a seed layer between the substrate and the undercoat layer.

14. The magnetic recording medium according to claim 13, wherein the seed layer is made of a NiAl alloy.

15. A magnetic recording apparatus comprising a magnetic recording medium, and at least a driving section to drive the magnetic recording medium in a recording direction, a magnetic head comprising a recording section and a reproducing section, a means to relatively move the magnetic head against the magnetic recording medium and a recording/reproducing signal treating means to input recording signals to the magnetic head and to output reproducing signals from the magnetic head, wherein the magnetic recording medium is a magnetic recording medium as defined in claim 1.

16. The magnetic recording medium according to claim 1, wherein $$|Lm-Li|/Lm<0.015.$$

17. The magnetic recording medium according to claim 1, wherein $$|Lm-Li|/Lm<0.017.$$

18. A magnetic recording apparatus comprising a magnetic recording medium, and at least a driving section to drive the magnetic recording medium in a recording direction, a magnetic head comprising a recording section and a reproducing section, a means to relatively move the magnetic head against the magnetic recording medium and a recording/reproducing signal treating means to input recording signals to the magnetic head and to output reproducing signals from the magnetic head, wherein the magnetic recording medium is a magnetic recording medium as defined in claim 4.

* * * * *